United States Patent [19]

Bennington et al.

[11] Patent Number: 4,526,955
[45] Date of Patent: Jul. 2, 1985

[54] RADIATION POLYMERIZABLE COMPOSITIONS CONTAINING ORGANOPOLYSILOXANES HAVING A —N—SI— OR —N—O—SI— LINKAGE

[75] Inventors: Lester D. Bennington, Adrian; Richard C. McAfee, Tecumseh, both of Mich.

[73] Assignee: SWS Silicones Corporation, Adrian, Mich.

[21] Appl. No.: 567,711

[22] Filed: Jan. 3, 1984

[51] Int. Cl.$^3$ ............... C08G 77/26; C08G 77/04
[52] U.S. Cl. .................... 528/33; 204/159.13; 524/864; 525/477; 525/478; 528/12; 528/20; 528/34; 528/36; 528/38; 528/901
[58] Field of Search ............ 204/159.13; 528/18, 528/32, 33, 34, 38, 12, 20, 36, 901; 527/477, 478

[56] References Cited

U.S. PATENT DOCUMENTS

| | | | |
|---|---|---|---|
| 3,766,128 | 10/1973 | Brady et al. | 528/38 |
| 3,817,909 | 6/1974 | Toporcer et al. | 528/32 |
| 3,960,575 | 6/1976 | Martin | 524/262 |
| 4,072,655 | 2/1978 | Louis et al. | 528/38 |
| 4,170,700 | 10/1979 | Sweet | 528/38 |
| 4,302,571 | 11/1981 | Arai et al. | 528/32 |
| 4,387,177 | 6/1983 | Mine et al. | 528/32 |
| 4,399,267 | 8/1983 | Bosch et al. | 528/18 |

*Primary Examiner*—Herbert J. Lilling

[57] ABSTRACT

Radiation polymerizable compositions containing organopolysiloxanes having an average of at least one nitrogen-containing group per molecule linked to a silicon atom through an Si—N or Si—O—N linkage and a photo-induced free radical source.

15 Claims, No Drawings

RADIATION POLYMERIZABLE COMPOSITIONS CONTAINING ORGANOPOLYSILOXANES HAVING A —N—SI— OR —N—O—SI— LINKAGE

The present invention relates to polymerizable compositions and more particularly to room temperature polymerizable compositions which are capable of being polymerized in the presence of a radiation source.

BACKGROUND OF THE INVENTION

Room temperature polymerizable silicone rubber compositions are described in U.S. Pat. Nos. 3,404,951 and 3,644,434 to Hittmair et al, in which compositions obtained by mixing a hydroxyl terminated linear organopolysiloxanes with amino-substituted organic silicon compounds are polymerized in the presence of atmospheric moisture.

Generally, these room temperature polymerizable compositions are exposed to atmospheric moisture for from about 5 to 30 minutes before the surface is tack-free.

Although some amino-substituted organosilicon compounds promote faster polymerization, the "pot-life" or "open-time" of the composition is not sufficient to provide adequate time for application. Consequently, slower polymerizing compositions are generally employed, which require a longer period of time for the surface to become "tack-free".

In many applications it is desirable to have a room temperature polymerizable composition which has a long "pot-life", but may be rapidly polymerized after it has been applied to a substrate.

One method for accelerating the polymerization of various organopolysiloxane compositions is to expose the compositions to a radiation source. Organopolysiloxane compositions which have been polymerized by a radiation source are described in U.S. Pat. No. 3,816,282 to Viventi, in which a composition consisting of a vinyl containing diorganopolysiloxane, a mercaptoalkyl substituted organopolysiloxane and a photosensitizer is exposed to a source of radiation.

Also, U.S. Pat. No. 4,362,674 to DuPont et al describes a process for making radiation cured articles which comprises treating an article molded into a desired shape from a composition containing hydroxyl-terminated organopolysiloxanes and a finely divided silica filler with an agent selected from ammonia gas, vapors of a volatile amine or a solution of a volatile amine to provide a transient cure in order to enable the molded article to withstand the stresses involved in mechanical handling during irradiation.

Although radiation polymerization of room temperature polymerizable compositions is not new per se, it has been found that radiation polymerization of room temperature polymerizable compositions free of a photo-initiator have certain advantages. For example, there are no residual fragments of photo-initiator present in the polymerized composition which will cause degradation of the polymerized composition. Moreover, the presence of photo-initiator will sometimes discolor the polymerized composition. Also, some photo-initiators are only slightly soluble in organopolysiloxane fluids and often bleed to the surface of the organopolysiloxane compositions.

In certain applications such as in assembly lines, the compositions must have a long "pot-life", but once it has been applied, rapid polymerization is necessary. It has been found that this may be achieved by exposing the compositions of this invention to an atmosphere of carbon dioxide during irradiation, even in the absence of photo-initiators. Of course, photoinitiators may be incorporated in the compositions of this invention to further accelerate the polymerization rate.

Therefore, it is an object of the present invention to provide radiation polymerizable organopolysiloxane compositions. Another object of the present invention is to provide organopolysiloxane compositions which are radiation polymerizable at ambient temperature. Still another object of the present invention is to provide organopolysiloxane compositions which are free of photo-initiators, but polymerize rapidly to a solid when exposed to a radiation source. Still another object of the present invention is to provide organopolysiloxane compositions having a long "pot-life", but when exposed to a radiation source, rapidly polymerize to a solid at ambient temperature. A further object of the present invention is to provide a process for polymerizing organopolysiloxane compositions which are free of photo-initiators. A still further object of the present invention is to provide organopolysiloxane compositions containing photo-initiators. A still further object of the present invention is to provide a process for accelerating the polymerization rate of organopolysiloxane compositions by exposing the organopolysiloxane compositions to a radiation source in the presence of carbon dioxide.

SUMMARY OF THE INVENTION

The foregoing objects and others which will become apparent from the following description are accomplished in accordance with this invention, generally speaking, by providing a method for accelerating the polymerization rate of organopolysiloxane compositions which comprises exposing a composition containing organopolysiloxanes having reactive groups and an organosilicon compound which is capable of reacting with the reactive groups of the organopolysiloxanes and having an average of more than one nitrogen-containing group bonded to silicon through an Si—N linkage or an Si—O—N linkage, to a radiation source in the presence or absence of atmospheric moisture and/or carbon dioxide. A photo-induced free radical source such as a photo-initiator or photo-sensitizer may be incorporated in the compositions to further accelerate the polymerization rate of these organopolysiloxane compositions.

DESCRIPTION OF THE INVENTION

The organopolysiloxanes employed herein are not novel and can be any branched or linear organopolysiloxanes containing reactive groups, preferably terminal hydroxyl groups, which have been employed heretofore in room temperature vulcanizable (RTV) compositions. Generally, the organopolysiloxanes having terminal hydroxyl groups may be represented by the formula

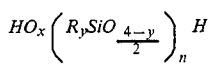

wherein each R is a monovalent hydrocarbon radical or substituted monovalent hydrocarbon radical, x has an average value of 0.99 to 1.01, y has an average value of 1.99 to 2.01, x+y =3, n is a number of at least 3 and preferably at least 50.

When the siloxane polymers are linear, they generally contain, for example, at least 90 mole percent of R$_2$SiO units. However, limited proportions, preferably below 5 mol percent of RSiO$_{3/2}$ units, R$_3$SiO$_{\frac{1}{2}}$ units and/or SiO$_{4/2}$ units can be present. These siloxane polymers generally have an average of from about 1.8 to about 2.2 hydrocarbon radicals per silicon atom.

These siloxanes are known and have been fully described in, for example, U.S. Pat. Nos. 3,294,732; 3,127,363; 3,105,061 and others.

Organopolysiloxane resins containing reactive groups may also be employed in the compositions of this invention. These resins contain polymer units of the formula RSiO$_{3/2}$, R$_2$SiO, R$_3$SiO$_{\frac{1}{2}}$ and SiO$_2$, in which R is the same as above. The resins generally have an average of from about 0.8 to about 1.7 hydrocarbon radicals per silicon atom.

Mixtures of linear and branched organopolysiloxanes as well as organopolysiloxane resins may be employed in the compositions of this invention.

In the above formula, each R can be a monovalent hydrocarbon radical having up to 18 carbon atoms. Examples of radicals represented by R include alkyl radicals such as methyl, ethyl, n-propyl, isopropyl, dodecyl and octadecyl radicals; alkenyl radicals such as vinyl, allyl, hexenyl and octadecenyl radicals; cycloalkyl radicals such as the cyclobutyl, cyclopentyl, cyclohexyl and cyclodecyl radicals; cycloalkenyl radicals such as the cyclobutenyl, cyclopentenyl, cyclohexenyl and cyclodecenyl radicals; aryl radicals such as phenyl, xenyl, naphthyl and the phenanthryl radicals, aralkyl radicals such as the benzyl, beta-phenylethyl and beta-phenylpropyl radicals and alkaryl radicals such as the tolyl, xylyl and ethylphenyl radicals.

Substituted hydrocarbon radicals represented by R include halogenhydrocarbon radicals such as o-, m- and p-chlorophenyl and bromophenyl radicals, a,a,a,-trifluorotolyl, 3,3,3-trifluoropropyl, chloro-, fluoro- and bromo-derivatives of the various hydrocarbon radicals set forth above as well as cyanoalkyl radicals such as beta-cyanoethyl, cyanopropyl, cyano-n-butyl, cyano-n-propyl and omega-cyanoctadecyl radicals.

Preferably the radicals represented by R have less than 8 carbon atoms and more preferably R represents methyl, phenyl, vinyl, ethyl, propyl and 3,3,3-trifluoropropyl radicals. Moreover, it is preferred that at least 50 mol percent of the R radicals are aliphatic hydrocarbon radicals of not more than 4 carbon atoms. Of course, as is usually the case, the R radicals on a single silicon atom can be the same or different and various units in the siloxane chain can be the same or different homopolymers, e.g., dimethylsiloxane polymers, copolymers, e.g., dimethylsiloxane methylvinylsiloxane-, phenylmethylsiloxane polymers and mixtures thereof. The siloxane polymers employed can vary from relatively mobile fluids (viscosity 50 mPa.s at 25° C.) to gum-like materials having viscosities up to about 10$^6$ mPa.s at 25° C. This can be seen from the value of n in the general formula above, where n is at least 3 and is preferably at least 50, but can have a value as high as 2,000,000. The preferred siloxane polymers are those having viscosities in the range from 200 to 200,000 mPa.s at 25° C.

Other organopolysiloxanes which may be employed in this invention are the organopolysiloxane compositions which are prepared by reacting polymerizable organic monomers or mixtures of polymerizable organic monomers having aliphatic unsaturation with organopolysiloxanes in the presence of a free radical initiator. These compositions have been referred to as modified organopolysiloxanes and include the entire nonvolatile reaction product, including grafted organopolysiloxanes, organic homopolymers and copolymers, if any. The modified organopolysiloxanes are well known and their preparation has been described in U.S. Pat. Nos. 3,555,109; 3,776,875; 3,627,836; 3,631,087; 3,694,478 and others, which are incorporated herein by reference.

The room temperature polymerizable organopolysiloxane compositions are preferably prepared by mixing under anhydrous conditions organopolysiloxanes and/or modified organopolysiloxanes containing hydroxyl groups with an organosilicon compound having an average greater than one of Si—N and/or Si—O—N linkages per molecule which are capable of reacting with the organopolysiloxanes. The organosilicon compound preferably contains an average of at least two and more preferably three or four groups per molecule having the Si—N and/or Si—O—N linkage.

Examples of groups having an Si—N linkage are the amine group (—NR'R'') and the amide group $$(-NR''-\overset{O}{\underset{\|}{C}}-R'),$$

in which the nitrogen atom is bonded to the silicon atom through a silicon-nitrogen linkage.

Groups having the Si—O—N linkage are, for example, the aminoxy group (—ONR'R'') and the oxime group (—ON=X) in which the aminoxy and oxime groups are bonded to a silicon atom through a silicon-oxygen-nitrogen linkage.

In the above formulas, R' and R'', which may be the same or different, represent monovalent hydrocarbon radicals having up to 18 carbon atoms, R'' may also represent hydrogen, and X is =CR'R'' or =CR''', where R''' 40 is a divalent hydrocarbon radical having up to 18 carbon atoms.

Examples of monovalent hydrocarbon radicals represented by R' and R'' are alkyl radicals having from 1 to 18 carbon atoms such as methyl, ethyl, propyl, n-butyl, sec-butyl, hexyl, octyl and octadecyl radicals; aryl radicals such as the phenyl and anthracyl radicals; cycloalkyl radicals such as the cyclohexyl radical; aralkyl radicals such as the benzyl and phenylethyl radicals; and alkaryl radicals such as the tolyl or xylyl radicals. In addition to the monovalent hydrocarbon radicals having up to 18 carbon atoms, R'' may also be hydrogen.

Divalent saturated hydrocarbon radicals represented by R''' are methylene, ethylene, propylene, butylene, hexylene, octylene and decylene radicals. Divalent unsaturated hydrocarbon radicals represented by R''' are ethenylene, propenylene, butenylene, hexenylene, octenylene and decenylene radicals. An example of a divalent cyclic hydrocarbon radical is the phenylene radical.

Examples of amine containing organosilicon compounds which are capable of reacting with the organopolysiloxanes are aminosilanes of the formula

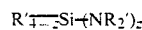

where R' and R", which may be the same or different, are the same as above, and z preferably has an average value of at least 3 per molecule.

The aminosilanes which are employed in the reaction preferably contain on the average 3 or 4 amine substituents per silicon atom and 0 or 1 hydrocarbon radicals per silicon atom. Thus, tri- or tetra-functional silanes may be employed and since the tetra-functional silanes are generally more reactive, they will generally react faster than the trifunctional silanes. In general, these trifunctional aminosilanes may be represented by the formula R'Si(NR'R")$_3$ and the tetra-functional silanes by the formula Si(NR'R")$_4$, where R' and R" are the same as above. Mixtures of these aminosilanes can also be employed.

Specific examples of amine containing organosilicon compounds which may be employed are methyl tris-(n-butylamino)silane, methyl tris-(cyclohexyl-amino)silane, methyl tris-(n-heptylamino)-silane, phenyl tris-(n-heptylamino)silane, phenyl tris-(3,5,5-trimethylcyclohexylamino)silane, methyl tris-(secbutylamino)silane, tetrakis-(n-butylamino)silane, dimethyl bis-(cyclohexylamino)silane, partial hydrolyzates and mixtures thereof.

Other organosilicon compounds which may be employed are amine containing siloxanes having the general formula

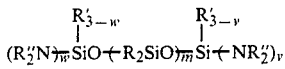

where R, R' and R" are the same as above, m is a number of from 0 to 50, v is a number of from 0 to 3, w is a number of from 0 to 3 and the sum of v+w is equal to at least 3.

The aminosilanes and aminosiloxanes are described, for example, in U.S. Pat. Nos. 3,408,325 to Hittmair et al; 3,464,951 to Hittmair et al; 3,451,964 to Creamer; 3,644,434 to Hittmair et al and 3,923,736 to Nitzsche et al, which are incorporated herein by reference.

Other organosilicon compounds which may be reacted with the organopolysiloxanes are aminosilazanes of the formula $$(R_2'N)_a R_b'Si\ NH[R_b'(R_2''N)_c Si\ NH]_g SiR_b'(NR_2'')_a$$

wherein R' and R" are the same as above and a is 2 or 3, b is 0 or 1, c is 1 or 2, and g is at least 1.

The aminosilazanes are described, for example, in U.S. Pat. No. 3,032,528 to Nitzsche et al, which is also incorporated herein by reference.

Still other organosilicon compounds which may be employed are aminoxysilanes of the general formula $$R'_{4-z}Si(ONR_2'')_z$$

and aminoxysiloxanes having the general formula

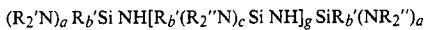

where R, R', R", m, v, w and z are the same as above.

Specific examples of aminoxy containing organosilicon compounds are methyl tris-(N,N-diethylaminoxy)silane, dimethyl bis-(N,N-diethylaminoxy)silane, tetrakis-(N,N-diethylaminoxy)silane, ethyl tris-(N,N-dipropylaminoxy)silane, butyl tris-(N,N-dimethylaminoxy)silane, methyl tris-(N,N-dibutylaminoxy)silane, methyl tris-(N-methyl-N-ethylaminoxy)silane and partial hydrolyzates thereof.

The aminoxysilanes and their methods of preparation are described in U.S. Pat. No. 3,448,136 to Pande et al and is incorporated herein by reference.

In the organosilicon compounds described above, oxime groups having the formula —ON=X, where X is a radical of the formula R'R"C= and R'''C=, where R', R" and R''' are the same as above, may be substituted for some or all of the amine groups.

Oxime-containing organosilicon compounds are described, for example, in U.S. Pat. No. 3,189,576 to Sweet and U.S. Pat. No. 3,398,112 to Johnson et al. Organosilicon compounds containing both oxime and amine groups are described, for example, in U.S. Pat. No. 3,674,738 to Nitzsche et al; U.S. Pat. No. 3,678,003 to Kaiser et al and U.S. Pat. No. 4,191,817 to Schiller et al.

Specific examples of oxime containing organosilicon compounds are methyl tris-(acetophenoximo)silane, methyl tris-(acetoximo)silane, methyl tris-(benzophenoximo) silane, ethyl tris-(2-butanoximo)silane, methyl tris-(3-methyl-2-butanoximo)silane, propyl tris-(2-nonanoximo)silane, butyl tris-(5-methyl-2-hexanoximo)silane, dimethyl bis-(acetoximo)silane, tetrakis-(acetoximo)silane and partial hydrolyzates thereof.

Organosilicon compounds having an amide group

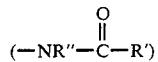

linked to the silicon atom through an Si—N linkage may also be employed in this invention. The amide containing silanes may be represented by the formula

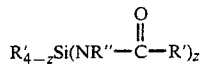

and the amide containing siloxanes may be represented by the formula

where R, R', R", m, v, w and z are the same as above.

Specific examples of amide containing silanes are methyl tris-(acetamido)silane, ethyl tris-(propionamido)silane, methyl tris-(hexanamido)silane, methyl tris-(octanamido)silane, ethyl tris-(hexanamido)silane, butyl tris-(butanamido)silane, octyl tris-(acetamido)silane, dimethyl bis-(acetamido)silane, diethyl bis-(propionamido) silane, dibutyl bis-(butanamido)silane, methyl tris-(N,N-diethyl benzamido)silane and the like.

The organosilicon compounds are employed in amounts which will provide at least one gram equivalent silicon atom of the amine, aminoxy, amide and/or oxime substituted organosilicon compound per gram equivalent of reactive groups present on the organopolysiloxane. Generally, from 0.2 to 40 parts by weight of the organosilicon compound is added for each 100 parts by weight of the organopolysiloxane containing reactive groups.

The compositions of this invention may be prepared by mixing the various ingredients in any order desired; however, the mixture should be prepared in an atmosphere which is substantially free of water.

In addition to the organopolysiloxane polymer and organosilicon compound, the composition may also contain additives such as compression-set additives, pigments, soluble dyes, aromatics (essential oils), oxidation inhibitors, heat stabilizers, flame retardants, light stabilizers, plasticizers, softeners, organopolysiloxane fluids, such as trimethylsiloxy-endblocked dimethylpolysiloxane fluids, reinforcing fillers and non-reinforcing fillers.

Examples of reinforcing fillers, i.e., fillers having a surface area of more than 50 m$^2$/g, are pyrogenically produced silicon dioxide, silica aerogels and precipitated silicon dioxide of large surface area.

Examples of non-reinforcing fillers, i.e., fillers having a surface area of less than 50 m$^2$/g are quartz, diatomaceous earth, calcium silicate, zirconium silicate, so-called "molecular sieves", metal oxide powders, such as titania, alumina, ferric oxide, zinc oxide and calcium carbonate. Fibrous fillers, for example, asbestos, glass fibers or organic fibers can also be used.

The fillers can advantageously be treated by known methods to include organosiloxy or alkoxy groups on their surface. Mixtures of different fillers can be used. The fillers are preferably employed in amounts of from 5 to 90 percent by weight, based on the total weight of the organopolysiloxane and filler.

Other additives which may be employed in the compositions of this invention are condensation catalysts such as those disclosed in, for example, U.S. Pat. Nos. 2,843,555; 3,127,363; and 3,082,527. Examples of suitable condensation catalysts are metallic salts and organometallic salts of carboxylic acids, such as lead octoate, dibutyltin dilaurate and dibutyltin salts of aliphatic carboxylic acids which are branched in the alpha-position to the carboxyl groups and have from 9 to 11 carbon atoms, amines, such as 3-ethoxypropylamine-1, and silanes which have at least one amine group bonded via carbon to silicon and at least one monovalent hydrocarbon radical, or a hydrocarbon radical substituted by an amine group and/or alkoxy group, and bonded via oxygen to silicon in each molecule. Silanes which not only act as condensation catalysts but as agents for improving the adhesion of the polymers to substrates, are N-beta-(aminoethyl)-gamma-aminopropyltrimethoxysilane or a compound of the formula

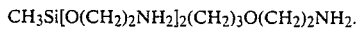
CH$_3$Si[O(CH$_2$)$_2$NH$_2$]$_2$(CH$_2$)$_3$O(CH$_2$)$_2$NH$_2$.

If condensation catalysts are used they are generally employed in amounts of from 0.01 to 5 percent by weight, preferably from 0.05 to 1 percent by weight, based on the total weight of the composition.

Photo-induced free radical sources which may be employed in the compositions of this invention are photo-initiators and photo-sensitizers such as acetophenone, propiophenone, benzophenone, xanthone, fluorenone, benzaldehyde, fluorene, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenene,4,4'-dimethoxybenzophenone, 4-chloro-4'-benzylbenzophenone, 3-chloroxanthone, 3,9-dichloroxanthone,3-chloro-8-nonylxanthone, 2,2-dimethoxy-2-phenylacetophenone and tetraethylplumbane. Other examples of photo-induced free radical sources are ditertiarybutyl peroxide, divinyl peroxide, t-butyl peracetate, ammonium persulfate, dibenzoyl peroxide and N,N azobisisobutyronitrile. The free radical sources which are useful in photosensitizers in the present case include any peroxide, persulfate, diazo compound, etc. that dissociates into free radicals. A particularly effective nitrile compound is alpha, alpha-azobisisobutyronitrile.

The amount of photo-induced free radical source will usually vary from about 0.01 to 20 percent by weight based on the weight of the siloxanes present. Generally, it is preferred the amount be in the range of 0.1 to 5 percent by weight.

The compositions of this invention, which are composed of an organopolysiloxane having reactive groups, an organosilicon compound containing amine, aminoxy, amide and/or oxime groups and a photo-induced free radical source, if desired, are exposed to a source of radiation in the presence of atmospheric moisture and/or carbon dioxide in excess of that present in the atmosphere. Any ultraviolet light source of from 2000 to 4000 Angstroms may be employed to polymerize these compositions. Another method of polymerizing the compositions is to employ electromagnetic radiation having a wavelength of from 2000 to 7000 Angstroms. Suitable examples of radiation sources which may be employed are low or medium pressure mercury lamps, and lasers.

In addition to ultraviolet and electromagnetic radiation, the compositions can also be polymerized by high energy ionizing radiation. In the ionizing radiation, the compositions are exposed to high energy particle radiation or by gamma-rays or X-rays. Charged particles such as protons, alpha particles, deuterons, electrons and neutrons may be employed. The charged particles may be accelerated to high speeds by means of various voltage gradient mechanisms such as a Van deGraaf generator, a cyclotron, a betatron, a synchroton or the like.

There are a number of means in which those utilizing the invention can control the polymerization rate to meet their own specific desires and needs. For example, the polymerization rate may be regulated by the dwell time, that is, the length of time the composition is exposed to the radiation source as well as the distance from the radiation source.

The compositions of this invention may be applied as a thin film to a substrate and then exposed to a radiation source. These compositions are especially useful in coating a variety of substrates such as paper, wood, glass, aluminum, tin plate, plastic and the like.

Various embodiments of this invention are further illustrated in the following examples, in which all parts are by weight unless otherwise specified.

EXAMPLE 1

An amine-terminated organopolysiloxane is prepared by adding 1,153 parts of hydroxyl-terminated dimethylpolysiloxane having a viscosity of 2000 mPa.s at 25° C., at the rate of from about 3.5 to 4 parts per minute to a reactor containing 543 parts of methyl tris-(sec-butylamino)silane with agitation under a dry nitrogen atmosphere. The contents of the reactor are agitated for one hour after the dimethylpolysiloxane addition is complete and then the excess methyl tris-(secbutylamino)silane is removed up to a temperature of about 82° C. at a vacuum of from 0.25 to 0.10 mm Hg. A portion of the resultant amine-terminated organopolysiloxane is mixed with a photo-initiator or mixtures of photo-initiators and applied to a polyester substrate (Mylar ®—available from DuPont) at a thickness of 3 mils. Another portion of the resultant amine-terminated organopolysiloxane, which is free of photo-initiator, is also applied to a polyester substrate at a thickness of 3 mils. The coated substrates are exposed to different environments in the presence of a UV source having an output of from about 2000 to 7000 Angstroms. The tack-free times of the coating are illustrated in Table I.

TABLE I

| Example No. | Photo-initiator | | Tack-Free Times (Minutes) | |
|---|---|---|---|---|
| | Compound | Amount (Percent) | Ambient Atmosphere* | Carbon Dioxide** |
| (a) | — | 0 | 21.7 | 10 |
| (b) | A | 0.5 | 5.7 | 5.4 |
| (c) | A | 1.0 | 3.9 | 3.3 |
| (d) | A | 2.5 | 2.3 | 2.1 |
| (e) | B | 0.5 | 6.7 | 10 |
| (f) | B | 1.0 | 3.7 | 2.8 |
| (g) | A | 0.5 | | |
| | B | 0.5 | 3.3 | 3 |
| (h) | A | 0.5 | | |
| | B | 1.0 | 2 | 1.8 |
| (i) | A | 1.0 | | |
| | B | 0.5 | 3 | 2.1 |

A = Benzophenone
B = 2,2-dimethoxy-2-phenylacetophenone (available from Ciba Geigy as Igracure ® 651).
*Carbon dioxide ~0.06 percent.
Relative humidity - percent at 23° C.
**Carbon dioxide > 20 percent.
Relative humidity - percent at 23° C.

EXAMPLE 2

About 100 parts of hydroxyl-terminated dimethylpolysiloxanes are mixed with 15 parts of fumed silica and 8 parts of methyl tris-(sec-butylamino) silane and applied to a polyester substrate (Mylar ®) at a thickness of 6 mils. The coated substrate is exposed to medium pressure mercury UV source which has an output in the 2000 to 4000 Angstroms region.

The coating is approximately 1.5 inches from the UV source. A tack-free film is formed after about 4.5 seconds.

EXAMPLE 3

The procedure described in Example 2 is repeated, except that benzophenone is added to the mixture in an amount of 1 percent by weight based on the weight of the dimethylpolysiloxane and applied to a polyester substrate at a thickness of 6 mils. The coated substrate is exposed to a UV source having an output in the range of from 2000 to 4000 Angstroms. After about 15 seconds the 6 mil coating is tack-free.

EXAMPLE 4

The procedure described in Example 1 is repeated, except that 8 parts of methyl tris-(cyclohexylamino)silane are substituted for methyl tris-(sec-butylamino)-silane. When the resultant mixture is applied at a thickness of 3 mils on a polyester substrate and exposed to radiation, the coating is tack-free in less than 3 minutes.

EXAMPLE 5

The procedure described in Example 4 is repeated, except that the coating is exposed to an atmosphere of carbon dioxide during irradiation. The coating is tack-free in less than 2 minutes.

EXAMPLE 6

The procedure described in Example 2 is repeated, except that 12 parts of fumed silica are substituted for the 15 parts of fumed silica. Essentially, the same results are obtained on irradiation.

EXAMPLE 7

About 100 parts of a 50/50 mixture of a polyorganosiloxane resin containing hydroxyl and ethoxy groups, (available as MK resin from Wacker-Chemie) and a hydroxyl terminated dimethylpolysiloxane having a viscosity of 2000 mPa.s at 25° C. are heated to about 85° C. until a clear solution is formed. The resultant solution is mixed with 60 parts of a methyl tris-(sec-butylamino)silane at about 25° C. and then applied as a top coat to a cured silicone impregnated fabric and exposed to a UV source for 6 seconds in atmospheric moisture. A solid coating is formed on the fabric which has a lower slip resistance than the silicone undercoat.

EXAMPLE 8

Ten parts of a mixture containing dimethyl bis-(sec-butyl amino)silane and methyl tris-(sec-butylamino)silane in a weight ratio of 3:1 are mixed with hydroxyl-terminated dimethylpolysiloxanes so that the average number of nitrogen containing groups is less than 3 per molecule. The composition is poured into an aluminum dish to a thickness of 50 mils and exposed to atmospheric moisture and a UV source for 120 seconds. The resultant composition forms a gel.

COMPARISON EXAMPLE

The procedure of Example 1 is repeated except that the substrates coated with the composition containing the photoinitiator are exposed to atmospheric moisture in the dark. The tack-free times are shown in Table II.

TABLE II

| Sample No. | Photo-initiator | | Tack-Free Times (Minutes) | |
|---|---|---|---|---|
| | Compound | Percent | Example | Comparison Example |
| (a) | — | 0 | 10 | 600 |
| (b) | A | 1.0 | 3.9 | 600 |
| (c) | B | 1.0 | 3.7 | 600 |
| (d) | A | 2.5 | 2.3 | 600 |

A = Benzophenone
B = 2,2-dimethoxy-2-phenylacetophenone

EXAMPLE 9

The procedure described in Example 3 is repeated, except that 8 parts of methyl tris-(N,N-diethylaminoxy)silane having the formula $$CH_3Si[ON(C_2H_5)_2]_3$$

are substituted for the methyl tris-(sec-butylamino)silane. The resultant product is applied to a polyester substrate as a 6 mil coating and exposed to a radiation source in the presence of atmospheric moisture. A tack-free coating is obtained faster than a similar coating exposed only to atmospheric moisture.

EXAMPLE 10

The procedure described in Example 2 is repeated, except that 8 parts of a tetrakis-(N,N-diethylaminoxy)silane are substituted for the methyltris-(sec-butylamino)silane. A tack-free coating is obtained after being exposed to a radiation source in the presence of atmospheric moisture.

EXAMPLE 11

The procedure described in Example 2 is repeated except that 8 parts of a ethyltris-(N,N-diethylaminoxy)silane are substituted for the methyl tris-(sec-butylamino)silane. A tack-free coating is obtained after being exposed to a radiation source in the presence of atmospheric moisture.

EXAMPLE 12

The procedure described in Example 2 is repeated, except that 8 parts of an oximosilane having the formula $CH_3Si[ON=C(CH_3)_2]_3$ are substituted for the methyl tris-(sec-butylamino)silane. The resultant product is applied as a 3 mil coating to a polyester substrate and then exposed to a radiation source. A solid tack-free coating is obtained.

EXAMPLE 13

The procedure described in Example 12 is repeated, except that 9 parts of an oximosilane having the formula $C_2H_3Si[ON=C(CH_3)_2]_3$ are substituted for the oximosilane having the formula $CH_3Si[ON=C(CH_3)_2]_3$.

The resultant composition is applied to a polyester substrate and irradiated with a UV light source. A solid film is formed on the polyester substrate.

EXAMPLE 14

The procedure described in Example 2 is repeated, except that 4 parts of methyl tris-(cyclohexylamino)silane and 4 parts of an oximosilane having the formula $CH_3Si[ON=C(CH_3)_2]_3$ are substituted for the 8 parts of methyl tris-(sec-butylamino)silane. The resultant composition is applied as a 6 mil coating to a polyester substrate and then irradiated. A solid film is obtained on the polyester substrate.

EXAMPLE 15

The procedure described in Example 2 is repeated, except that 8 parts of methyl tris-(acetamido)silane are substituted for the 8 parts of methyl tris-(sec-butylamino)silane. The resultant composition is applied as a 6 mil coating to a polyester substrate and then irradiated. A solid film is obtained on the polyester substrate.

What is claimed is:

1. A composition capable of being cured to an elastomer by irradiation comprising an organopolysiloxane having an average of at least one nitrogen containing group per molecule linked to a silicon atom through an Si—N or Si—O—N linkage and a photo-induced free radical generating compound in an amount of from about 0.01 to 20 percent by weight based on the weight of the siloxane, said nitrogen containing organopolysiloxane is obtained from the reaction of an organopolysiloxane having at least two hydroxyl groups per molecule with an organosilicon compound having an average of more than one nitrogen containing reactive group per molecule selected from the group consisting of an amine, aminoxy, amide, oxime and mixtures thereof.

2. The composition of claim 1, wherein the nitrogen containing organopolysiloxane contains an average of at least two terminal amine groups per molecule.

3. The composition of claim 1, wherein the nitrogen containing organopolysiloxane contains an average of at least two terminal oxime groups per molecule.

4. The composition of claim 1, wherein the nitrogen containing organopolysiloxane contains an average of at least two terminal aminoxy groups per molecule.

5. The composition of claim 1, wherein the nitrogen containing polysiloxane contains an average of at least two terminal amide groups per molecule.

6. The composition of claim 1, wherein the organosilicon compound is an aminosilane.

7. The composition of claim 1, wherein the organosilicon compound is an oximosilane.

8. The composition of claim 1, wherein the organosilicon compound is an aminoxysilane.

9. The composition of claim 1, wherein the organosilicon compound is an amidosilane.

10. A method for accelerating the curing of an organopolysiloxane composition to an elastomer which comprises exposing an organopolysiloxane having an average of at least one nitrogen containing group per molecule linked to a silicon atom through an Si—N or Si—O—N linkage to a radiation source in the absence of atmospheric moisture, said nitrogen containing organopolysiloxane is obtained from the reaction of an organopolysiloxane having at least two hydroxyl groups per molecule with an organosilicon compound having an average of more than one nitrogen containing reactive group per molecule selected from the group consisting of an amine, aminoxy, amide, oxime and mixtures thereof.

11. The method of claim 10, wherein the organopolysiloxane composition is exposed to a radiation source in the presence of carbon dioxide.

12. The method of claim 10, wherein the organopolysiloxane composition contains a photo-induced free radical generating compound.

13. The method of claim 11, wherein the organopolysiloxane composition contains a photo-induced free radical generating compound.

14. The method of claim 11, wherein the organopolysiloxane composition is exposed to atmospheric moisture.

15. The method of claim 10, wherein the organopolysiloxane composition is exposed to a radiation source in the presence of atmospheric moisture.

* * * * *